(12) United States Patent
Confer

(10) Patent No.: US 11,065,967 B2
(45) Date of Patent: Jul. 20, 2021

(54) SYSTEMS AND METHODS FOR A MODULAR BATTERY SYSTEM

(71) Applicant: The Raymond Corporation, Greene, NY (US)

(72) Inventor: Thomas W. Confer, Chenango Forks, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 16/534,700

(22) Filed: Aug. 7, 2019

(65) Prior Publication Data

US 2020/0047630 A1 Feb. 13, 2020

Related U.S. Application Data

(60) Provisional application No. 62/715,888, filed on Aug. 8, 2018.

(51) Int. Cl.
B60L 50/64 (2019.01)
H01M 50/20 (2021.01)

(52) U.S. Cl.
CPC .............. *B60L 50/64* (2019.02); *H01M 50/20* (2021.01); *B60L 2200/40* (2013.01); *H01M 2220/20* (2013.01)

(58) Field of Classification Search
CPC ......... B60L 50/64; B60K 1/04; H01M 2/1083
See application file for complete search history.

(56) References Cited

U.S. PATENT DOCUMENTS

| 7,712,563 | B2 | 5/2010 | Niebuhr | |
| 8,439,144 | B2* | 5/2013 | Murase | B66F 9/07536 180/68.5 |
| 8,852,794 | B2 | 10/2014 | Laitinen | |
| 9,193,316 | B2 | 11/2015 | McLaughlin | |
| 9,583,749 | B2 | 2/2017 | Okuyama | |
| 9,827,840 | B2 | 11/2017 | Wen | |
| 9,908,431 | B2 | 3/2018 | Kirk | |
| 10,003,050 | B2 | 6/2018 | Morisaku | |
| 2002/0022159 | A1 | 2/2002 | Pierson | |
| 2003/0070850 | A1 | 4/2003 | Reid | |
| 2009/0283346 | A1 | 11/2009 | Katae | |
| 2012/0018235 | A1 | 1/2012 | O'Quinn | |
| 2016/0049702 | A1* | 2/2016 | Oishi | H01M 10/6572 429/62 |

FOREIGN PATENT DOCUMENTS

| EP | 1780170 A1 | 5/2007 |
| EP | 1925588 A2 | 5/2008 |
| EP | 1985767 A1 | 10/2008 |
| EP | 2011761 A2 | 1/2009 |
| EP | 2840056 A1 | 2/2015 |

OTHER PUBLICATIONS

European Patent Office; Extended European Search Report for application 19190438.2, dated Dec. 6, 2019.

* cited by examiner

*Primary Examiner* — John D Walters
*Assistant Examiner* — James J Triggs
(74) *Attorney, Agent, or Firm* — Quarles & Brady LLP

(57) ABSTRACT

A modular battery system for use with a material handling vehicle, the modular battery system comprises a battery assembly and a counterweight assembly. The battery assembly can include a power source and a battery base, and the counterweight assembly can include a counterweight base configured to slidably receive the battery base and be removably secured thereto.

19 Claims, 15 Drawing Sheets

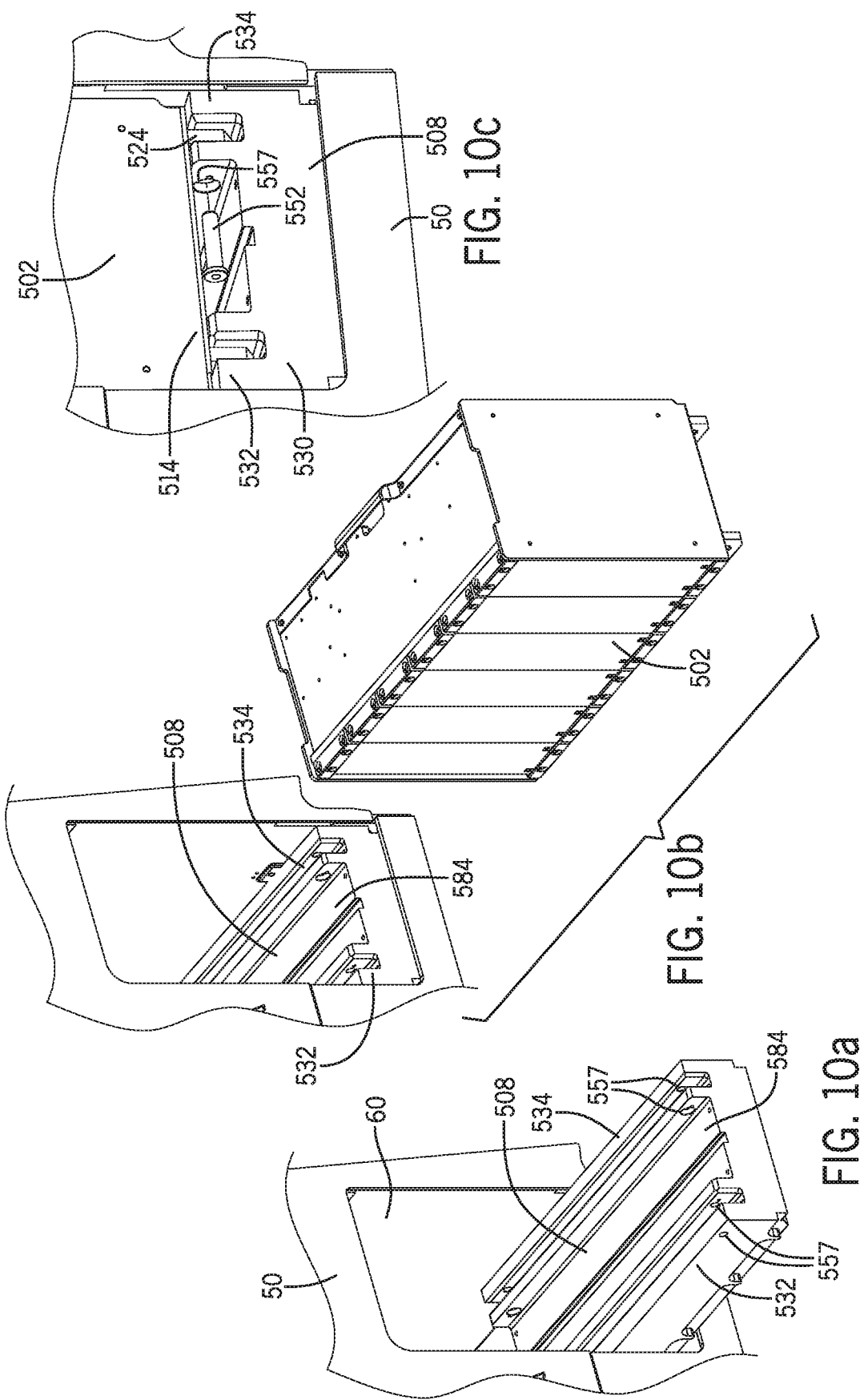

US 11,065,967 B2

SYSTEMS AND METHODS FOR A MODULAR BATTERY SYSTEM

CROSS-REFERENCE TO RELATED APPLICATIONS

This application claims the benefit of U.S. Provisional Patent Application Ser. No. 62/715,888, filed Aug. 8, 2018, and entitled "Systems and Methods for a Modular Battery System," which is hereby incorporated by reference.

STATEMENT CONCERNING FEDERALLY SPONSORED RESEARCH OR DEVELOPMENT

Not applicable.

FIELD OF THE INVENTION

The present invention relates to the field of material handling vehicles, and more specifically to battery systems for material handling vehicles.

BACKGROUND OF THE INVENTION

Material handling vehicles are designed in a variety of configurations to perform a variety of tasks. These types of vehicles are commonly used in a warehouse or a factory to transport, store, and retrieve materials and finished goods.

In warehousing operations, material quantities and inventory turnover rates are increasing rapidly. Therefore, to maintain competitiveness, it is important for warehousing operations to ensure that each piece of equipment is productive. Material handling vehicles typically require physically large batteries in order to provide power to the vehicle for extended periods of time.

In some material handling vehicles, lead-acid batteries are used as a power source. In addition to powering the material handling vehicle, lead-acid batteries can also serve as a counterweight to counterbalance the load carried by the vehicle. Lithium-ion batteries are also commonly used to power material handling vehicles. Material handling vehicles using lithium-ion batteries can include additional weights, often in the form of metal plates, in order to function as a counterweight.

SUMMARY OF THE INVENTION

Embodiments of the present invention overcome the drawbacks of previous systems and methods by providing systems and methods that include a modular battery system.

In one aspect of the invention a modular battery system for a material handling vehicle can include a battery assembly and a counterweight assembly. The battery assembly can include a battery base, which can be configured to support a power source and can include a battery attachment interface. The counterweight assembly can include a counterweight base with a counterweight attachment interface that may be configured to slidably engage the battery attachment interface to selectively secure the battery assembly to the counterweight assembly.

In some forms, one of the battery attachment interface and the counterweight attachment interface can be configured as a first attachment interface that includes a positioning portion. The other of the battery attachment interface and the counterweight attachment interface can be configured as a second attachment interface that may include a channel configured to slidably receive the positioning portion. Movement of the battery assembly with respect to the counterweight assembly may be restricted in at least one direction when the positioning portion is received in the channel.

In some forms, the positioning portion can include a roller bearing configured to provide a rolling interface between the positioning portion and the channel. Additionally or alternatively, the positioning portion can be configured as a left positioning portion, and the first attachment interface can include an additional positioning portion configured as a right positioning portion. The channel can configured as a left channel for engaging the left positioning portion and the second attachment interface includes an additional channel configured as a right channel for engaging the right positioning portion.

In some forms, at least one of the battery attachment interface and the counterweight attachment interface can include a roller bearing configured to provide a rolling interface between the battery attachment interface and the counterweight attachment interface. The roller bearing may include a shimming puck for adjusting a position of the roller bearing.

In some forms, at least one of the battery attachment interface and the counterweight attachment interface can include a non-metal slide, which may be configured to provide a sliding interface between the battery attachment interface and the counterweight attachment interface. The counterweight assembly further can include a detachable weight configured to be manually coupled to the counterweight base.

In some forms, the modular battery system can include a retention pin configured to be manually engaged with a first opening attachment in battery attachment interface and a second attachment opening in the counterweight attachment interface to restrict movement of the battery assembly relative to the counterweight assembly. The first opening may be formed in a battery bracket and the second opening may be formed in a counterweight bracket. Further, the modular battery system can include a detachable weight configured to be secured to the counterweight assembly the detachable weight can be configured to inhibit disengagement of the retention pin from the first attachment opening and the second attachment opening.

In some forms, the modular battery system can include a retention plate configured to be manually secured to at least one of the battery assembly and the counterweight assembly to restrict movement of the battery assembly relative to the counterweight assembly.

In another aspect of the invention, a material handling vehicle can include a vehicle body, a counterweight assembly, and a battery assembly. The vehicle body can include a battery compartment and a vehicle mounting interface positioned within the battery compartment. The counterweight assembly can be configured to be received in the battery compartment and may include a counterweight mounting interface configured to be manually engaged with the vehicle mounting interface. The battery assembly can include an energy source for powering the material handling vehicle, and may be configured to be slidably received by the counterweight assembly.

In some forms, one of the vehicle mounting interface and the counterweight mounting interface can be configured as a first mounting interface that includes a mounting feature, and the other of the vehicle mounting interface and the counterweight mounting interface can be configured as a second mounting interface configured to be engaged by the mounting feature. Movement of the counterweight assembly with respect to the vehicle body may be restricted in at least one direction when the mounting feature is engaged with the second mounting interface.

In some forms, the mounting feature is can be configured as a ridge and the second mounting interface may include a slot configured to receive the ridge. Additionally or alternatively, the first mounting interface can include a positioning bar extending across the counterweight assembly or the battery compartment, and the second mounting interface can include a slot configured to receive the positioning bar.

In some forms, the material handling vehicle can include a mounting pin, which may be configured to be manually engaged with a first mounting opening in vehicle mounting interface and a second mounting opening in the counterweight mounting interface to restrict movement of the counterweight assembly relative to the vehicle body.

In yet another aspect of the invention, a method of coupling a battery assembly and a counterweight assembly to a material handling vehicle, which may include a battery compartment, is provided. The method can include steps for receiving the counterweight assembly into the battery compartment, engaging a vehicle mounting interface in the battery compartment with a counterweight mounting interface on the counterweight assembly, slidably receiving the battery assembly into the battery compartment to engage a counterweight attachment interface with a battery attachment interface, and coupling the battery assembly to the counterweight assembly, thereby coupling the battery assembly to the material handling vehicle.

In some forms, at least one of the battery attachment interface and the counterweight attachment interface can include a roller bearing, and the step of slidably receiving the battery assembly can include rolling the battery assembly into the battery compartment on a rolling interface provided by the roller bearing. Additionally or alternatively, the step of slidably receiving the battery assembly may include steps for inserting a positioning portion into a channel.

It is to be appreciated that the features described above can be combined in any number of various ways to describe systems or methods that incorporate features disclosed herein.

The foregoing and other objects and advantages of the invention will appear in the detailed description which follows. In the description, reference is made to the accompanying drawings which illustrate preferred embodiments.

BRIEF DESCRIPTION OF THE DRAWINGS

FIG. 10a is a perspective view of the counterweight assembly of FIG. 9a with a material handling vehicle.

FIG. 10b is a perspective view of the battery assembly of FIG. 9b with the counterweight assembly and material handling vehicle of FIG. 10a, where the counterweight assembly is engaged with the material handling vehicle.

FIG. 10c is a perspective view of the counterweight assembly and material handling vehicle of FIG. 10b, with a retention pin coupling the counterweight assembly to the material handling vehicle.

Figure 1A:
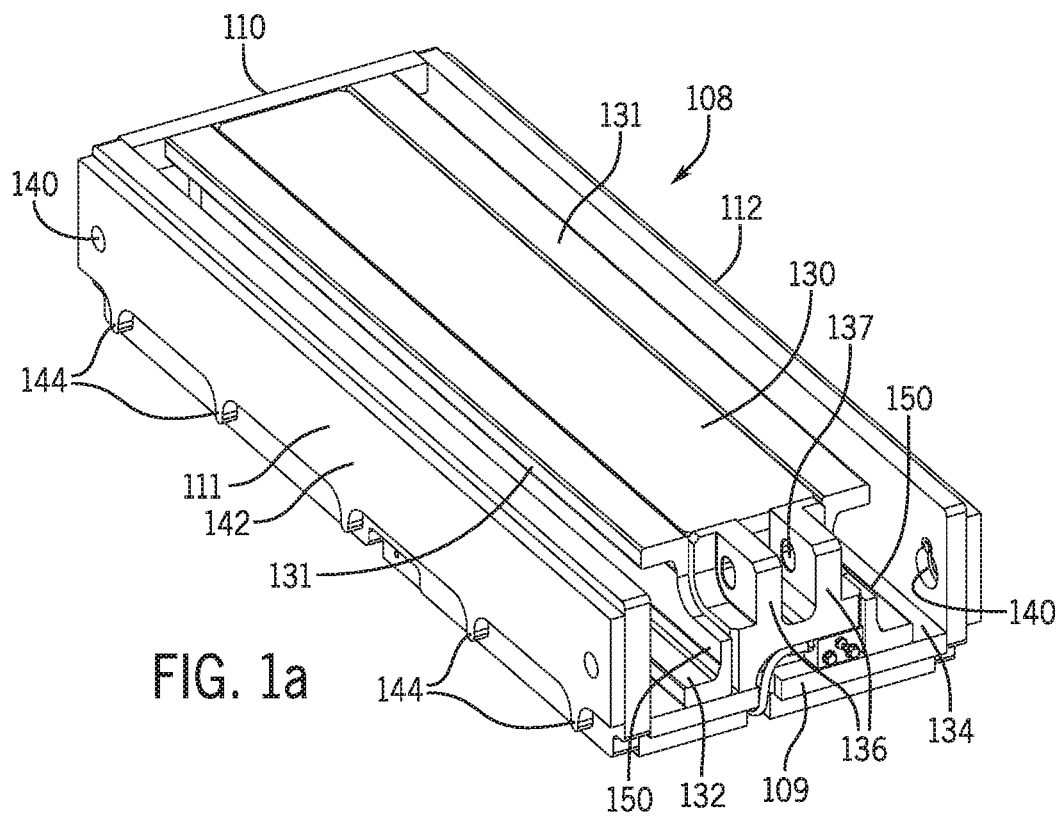
FIG. 1a is a perspective view of a counterweight assembly according to one embodiment of the invention.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The invention will now be described more specifically with reference to the following embodiments. It is to be noted that the following embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Furthermore, the use of "right," "left," "front," "back," "upper," "lower," "above," "below," "top," or "bottom" and variations thereof herein is for the purpose of description and should not be regarded as limiting.

Unless specified or limited otherwise, the terms "connected" and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically. Thus, although schematics shown in the figures depict example arrangements of processing elements, additional intervening elements, devices, features, or components may be present in an actual embodiment.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to implement aspects detailed herein.

Disclosed herein is a modular battery system including a detachable counterweight assembly and a detachable battery assembly. Embodiments of the modular battery system illustrated in the figures are configured to for use with a material handling vehicle which has a vehicle body and a battery compartment. In other embodiments, however, it should be appreciated that a modular battery system can be configured for use with other material handling vehicles which do not include a battery compartment and which may include additional features not described herein. In still other embodiments, a modular battery system could be used with alternate types of industrial or consumer vehicles.

In some embodiments, a battery attachment interface and a complimentary counterweight attachment interface can be configured to be engaged with each other to secure the battery assembly to the counterweight assembly. In some embodiments, the interfaces can include attachment features, such as channels and positioning portions, for insertion into and interleaved (and other) engagement with corresponding attachment feature.

Referring now to the Figures, and more particularly to FIGS. 1a-2d, an embodiment of a modular battery system 100 configured for use with a material handling vehicle 50 is shown. The modular battery system 100 can include a battery assembly 102 and a counterweight assembly 108 configured to be removably secured to the battery assembly 102. The material handling vehicle 50 can include a battery compartment 60 dimensioned so that the battery assembly 102 and the counterweight assembly 108 can simultaneously fit therein.

The battery assembly 102 can define a battery assembly front side 103, a battery assembly back side 104, a battery assembly left side 105, and a battery assembly right side 106, and can include a battery base 114 and a battery enclosure 116. The battery enclosure 116 can include an enclosure frame 118 configured to house at least one power source 120 in such a way that each power source 120 is removably secured within the battery enclosure 116, e.g., to the battery base 114. Additionally or alternatively, at least one of the power sources 120 can be coupled directly to the battery base 114 without inclusion of a battery enclosure 116.

Figure 1B:
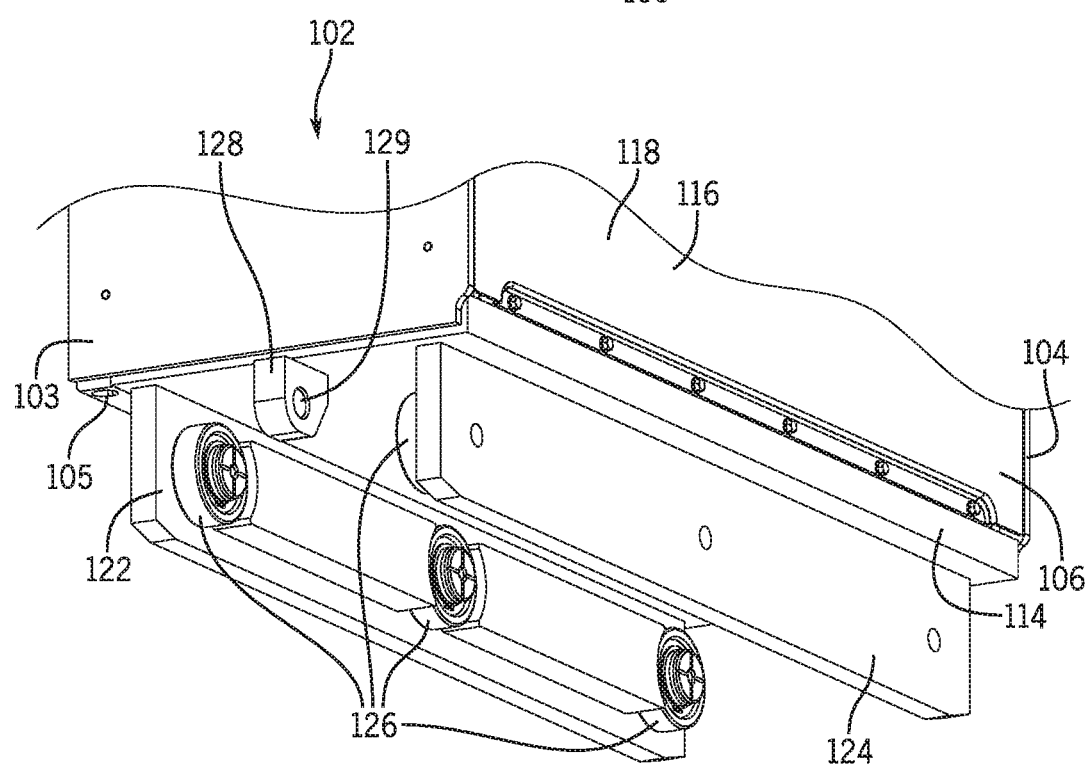
FIG. 1b is a perspective view of a battery assembly according to one embodiment of the invention.

Referring to FIG. 1b, the battery assembly 102 can further include a battery attachment interface with a left positioning portion 122 and a right positioning portion 124 which are coupled to and extend downwardly from the battery base 114 between the battery assembly front and back sides 103, 104. The left and right positioning portions 122, 124 can further be positioned proximate the battery assembly left and right sides 105, 106, respectively, and may be oriented so that they are parallel to the battery assembly left and right sides 105, 106. In some embodiments, multiple individual sections of positioning features may be used in place of at least one of the left positioning portion 122 and the right positioning portion 124. A battery bracket 128 defining a battery bracket opening 129 can be coupled to the battery base 114 proximate the battery assembly front side 103, and may be positioned between the left and right positioning portions 122, 124.

The battery assembly 102 can also include a plurality of roller bearings 126 which are rotatably coupled to at least one of the left positioning portion 122 and the right positioning portion 124, each roller bearing 126 optionally including an adjustable shimming puck (not shown). The roller bearings 126 can be spaced along the lengths of the positioning portions 122, 124 and are configured to provide a rolling interface between the battery assembly 102 and the counterweight assembly 108. In some embodiments, the roller bearings may be part of the battery attachment interface.

It should be appreciated that, in some embodiments, at least one of the battery enclosure 116, the left positioning portion 122, the right positioning portion 124, and the battery bracket 128 may be integrally formed in the battery base 114. Additionally, the connections between at least one of the battery base 114, the battery enclosure 116, the left positioning portion 122, the right positioning portion 124, the battery bracket 128, and the roller bearings 126 may be different than the illustrated connections. For example, at least one of the left positioning portion 122 and the right positioning portion 124 may be coupled directly to the battery enclosure 116 or to the power source 120, and the roller bearings 126 may be coupled directly to the battery base 114.

Referring now to FIG. 1a, the counterweight assembly 108 can define a counterweight assembly front side 109, a counterweight assembly back side 110, a counterweight assembly left side 111, and a counterweight assembly right side 112, and can include a counterweight base 130. The counterweight base 130 can include a counterweight attachment interface with a left channel 132 and a right channel 134 formed in the counterweight base 130 between the counterweight assembly front and back sides 109, 110 and positioned proximate and parallel to the counterweight assembly left and right sides 111, 112, respectively. The counterweight base 130 can further include at least one counterweight bracket 136 defining a counterweight bracket opening 137, and at least one mounting opening 140 formed in the counterweight base 130. The counterweight assembly 108 can also include a counterweight mounting interface with at least one counterweight mounting feature 142 protruding outwardly from the counterweight base 130, and the mounting feature 142 may include at least one ridge 144. In the illustrated embodiment, a mounting feature 142 extends outwardly from each of the counterweight assembly left and right sides 111, 112, and each mounting feature 142 includes five ridges 144 spaced along the mounting feature 142 between the counterweight assembly front and back sides 109, 110. In other embodiments, the quantity, shape, size, and configuration of the mounting features 142 and ridges 144 may vary.

It should be appreciated that at least one of the left channel 132, the right channel 134, the counterweight bracket 136, and the mounting features 142 can be integrally formed in the counterweight base 130 or can be a separate component which is coupled to the counterweight base 130. Similarly, in some embodiments the mounting opening 140 may be formed in a separate part coupled to the battery base 114. The mounting features 142 may include alternatively shaped projections in place of the ridges 144. For example, cylindrical features (not shown) may be used in some embodiments.

Looking to FIGS. 2a-2d, the material handling vehicle 50 can include a vehicle mounting interface with at least one slot (not shown) formed within the battery compartment 60. Each slot corresponds to one of the ridges 144 of the counterweight assembly 108 and is configured to engage the corresponding ridge 144. While at least one slot is engaged with a ridge 144, relative motion between the counterweight assembly 108 and the material handling vehicle 50 is restricted. This may be useful, for example, so that the counterweight assembly 108 is retained in the battery compartment 60 while the counterweight mounting interface is engaged with the vehicle mounting interface. In some embodiments, a mounting feature of a counterweight mounting interface can be configured to engage another portion of the vehicle mounting interface. For example, a mounting feature can be configured to engage a groove, a notch, a latch, a projection or another structure. The battery compartment 60 can further include at least one compartment opening (not shown), wherein each of the compartment openings corresponds to a mounting opening 140. The compartment openings can further be configured so that, when the ridges 144 are engaged with the slots, the mounting openings 140 are concentric with the compartment openings. This can be useful, for example, so that a mounting pin 148 can be inserted into the mounting opening 140 and the compartment opening simultaneously, thereby coupling the counterweight assembly 108 to the material handling vehicle 50. In some embodiments, a bolt or another fastener may be used to secure the counterweight assembly 108 to the material handling vehicle 50.

Referring back to the counterweight assembly 108 of FIG. 1a, each of the channels 132, 134 can each include an entry notch 150 proximate the counterweight assembly front side 109, and can further be configured so that the left channel 132 and the right channel 134 can receive the roller bearings 126 coupled to the left positioning portion 122 and the right positioning portion 124, respectively, through the entry notches 150. The channels 132, 134 may restrict lateral motion of the roller bearings 126 to the left or to the right, and an upper portion 131 of each of the channels 132, 134 can restrict vertical motion of the roller bearings 126. The roller bearings 126 of the battery assembly 102 can roll along a lower portion of each of the channels 132, 134 so that the battery assembly 102 moves towards the counterweight assembly back side 110 and at least one additional roller bearing 126 enters the channels 132, 134 through the entry notches 150. In some embodiments, the battery assembly 102 may continue rolling until at least one rolling bearing 126 abuts the counterweight assembly back side 110 at the end of the channels 132, 134. When the battery assembly 102 is fully received by the counterweight assembly 108, the battery bracket 128 and the counterweight bracket 136 may be positioned so that the battery bracket opening 129 and the counterweight bracket opening 137 are concentric with each other. A retention pin 152 can be inserted through the battery bracket opening 129 and the counterweight bracket opening 137, thereby coupling the battery assembly 102 to the counterweight assembly 108. In some embodiments, a retainer ring 153 can be attached to the retention pin 152 to retain the retention pin 152 in the battery bracket opening 129 and the counterweight bracket opening 137.

Figure 2A:
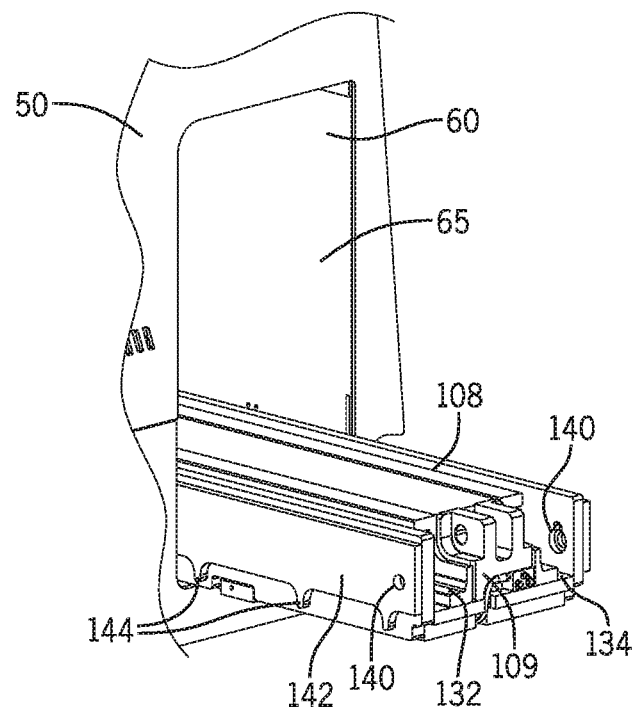
FIG. 2a is a perspective view of the counterweight assembly of FIG. 1a with a material handling vehicle.
Figure 2B:
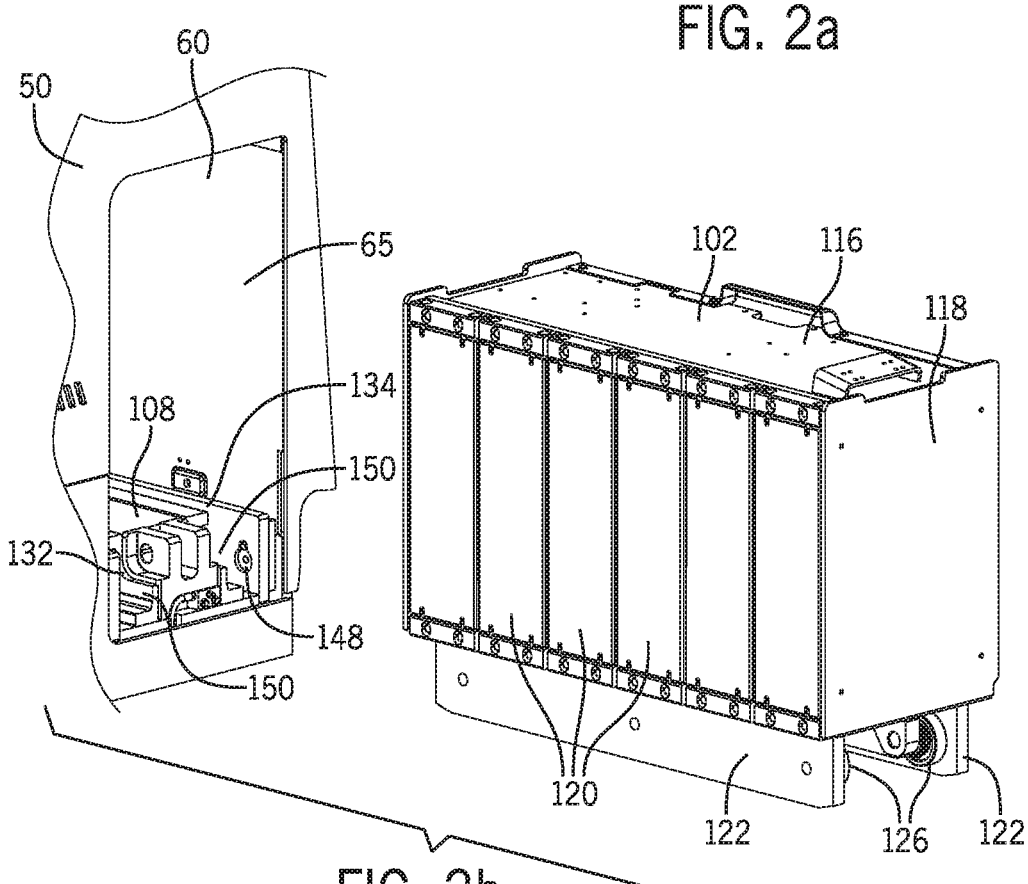
FIG. 2b is a perspective view of the battery assembly of FIG. 1b with the counterweight assembly and material handling vehicle of FIG. 2a, where the counterweight assembly is engaged with the material handling vehicle.
Figure 2C:
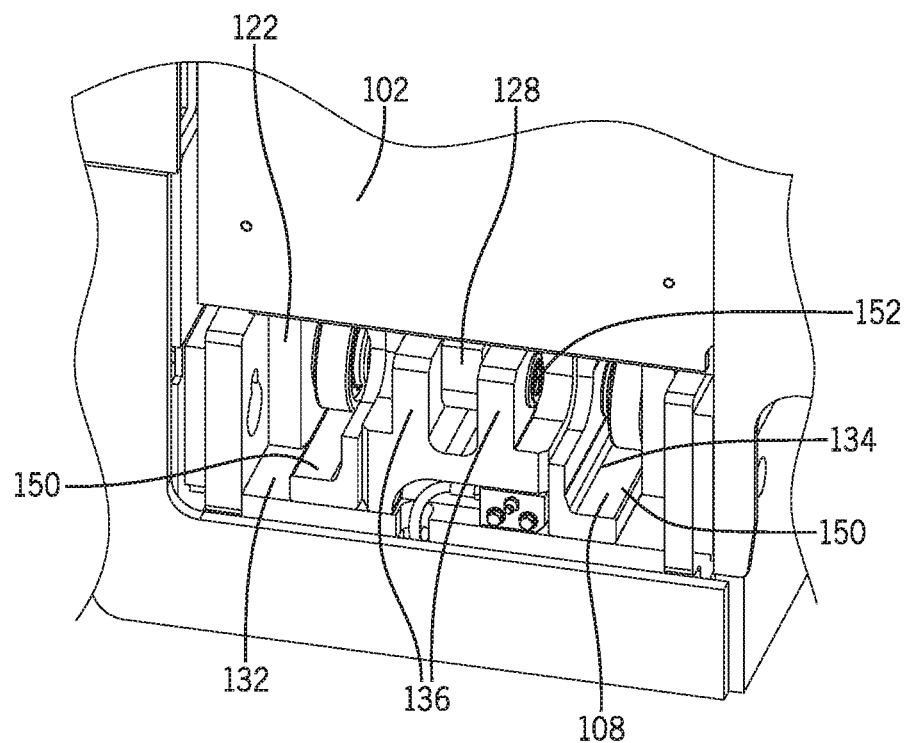
FIG. 2c is a perspective view of the battery assembly, the counterweight assembly, and the material handling vehicle of FIG. 2b, where the battery assembly is received by the counterweight assembly.
Figure 2D:
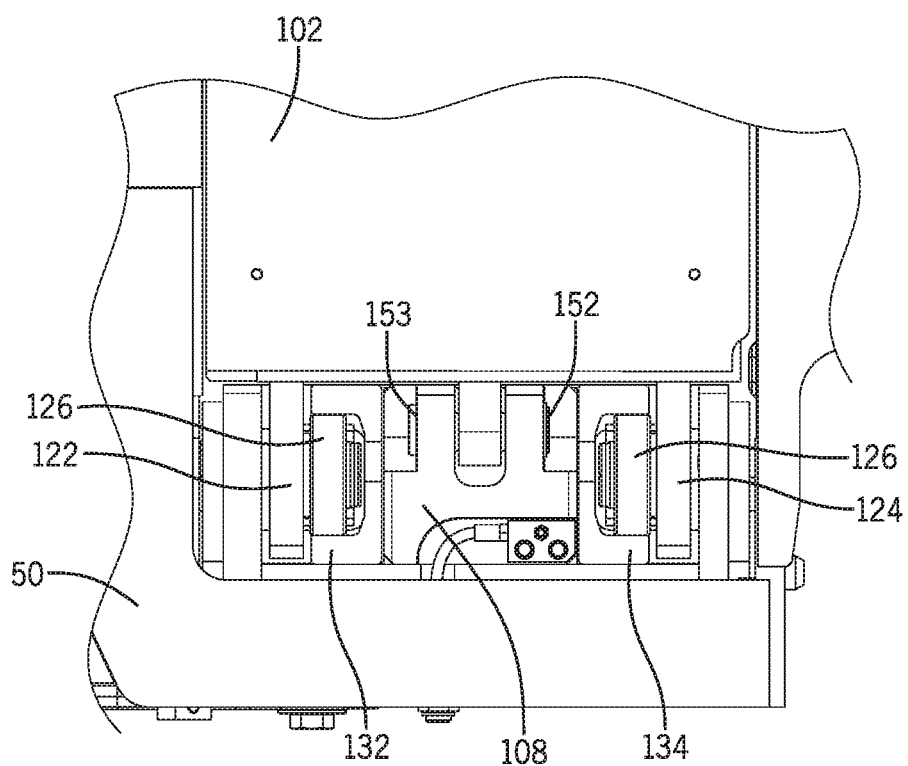
FIG. 2d is a front view of the battery assembly, the counterweight assembly, and the material handling vehicle of FIG. 2c.
Figure 3A:
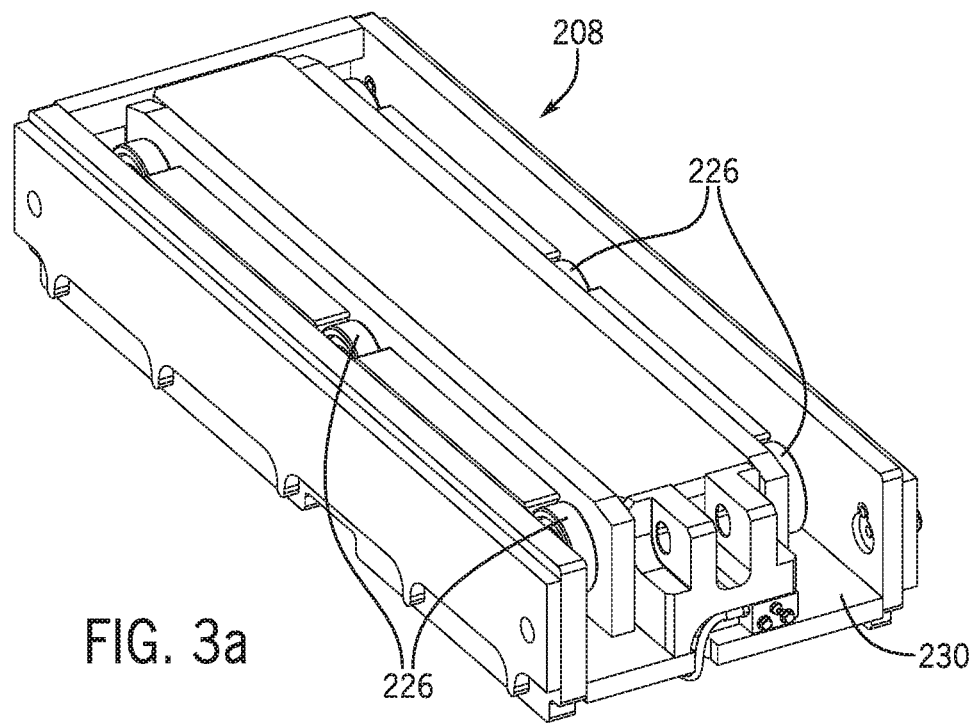
FIG. 3a is a perspective view of a counterweight assembly according to one embodiment of the invention.
Figure 3B:
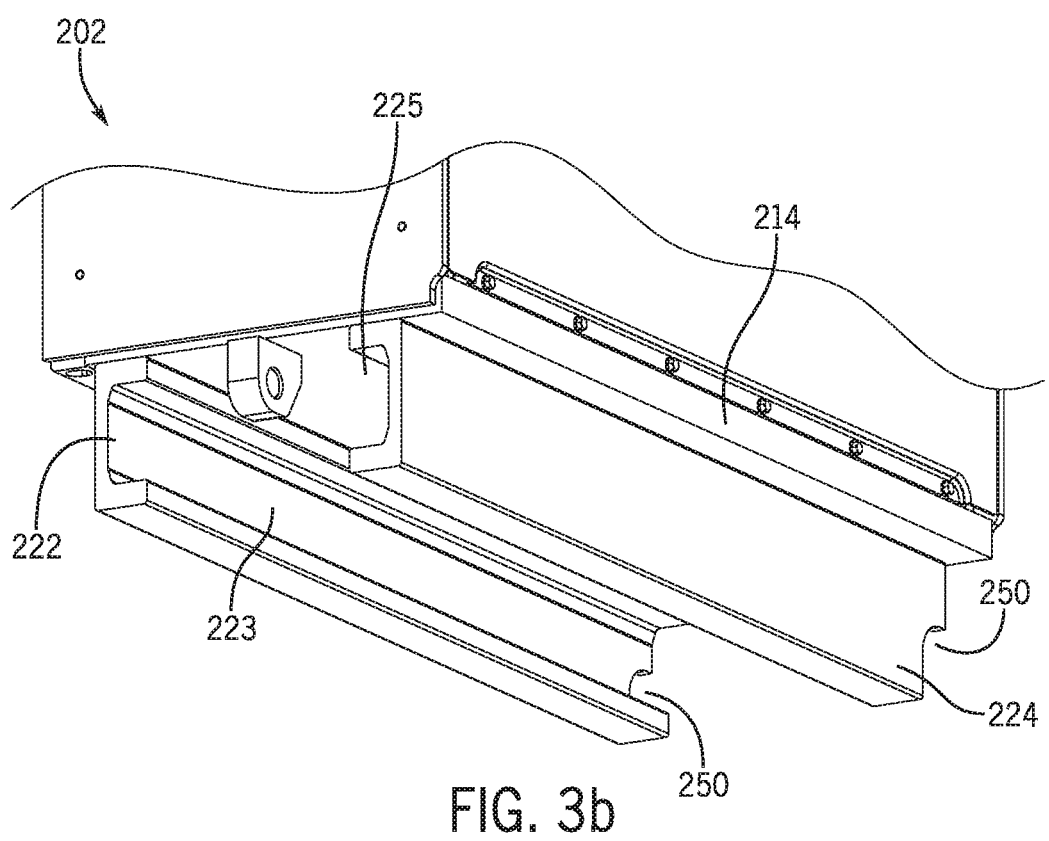
FIG. 3b is a perspective view of a battery assembly according to one embodiment of the invention.
Figure 4A:
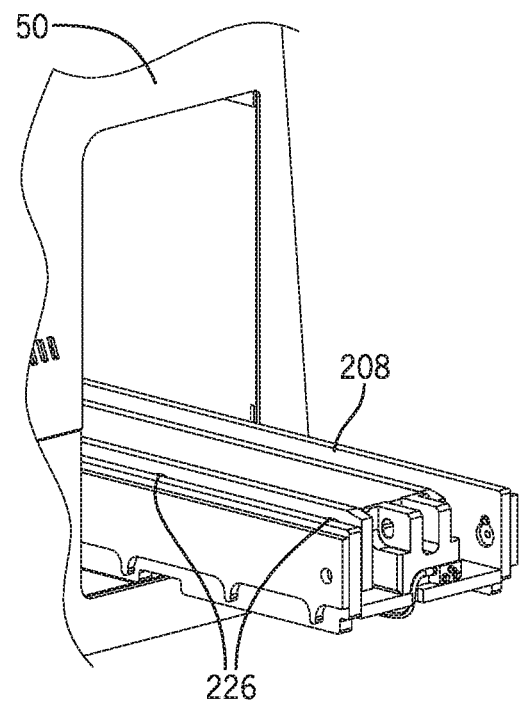
FIG. 4a is a perspective view of the counterweight assembly of FIG. 3a with a material handling vehicle.
Figure 4B:
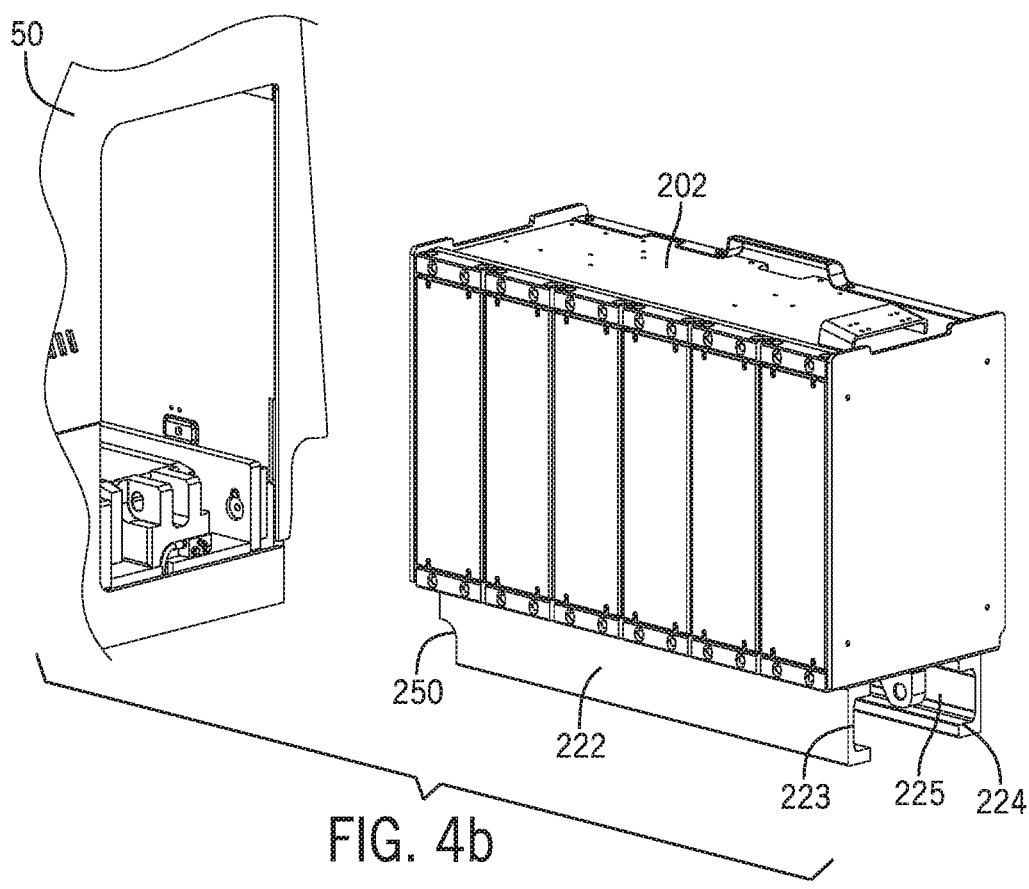
FIG. 4b is a perspective view of the battery assembly of FIG. 3b with the counterweight assembly and material handling vehicle of FIG. 4a, where the counterweight assembly is engaged with the material handling vehicle.
Figure 4C:
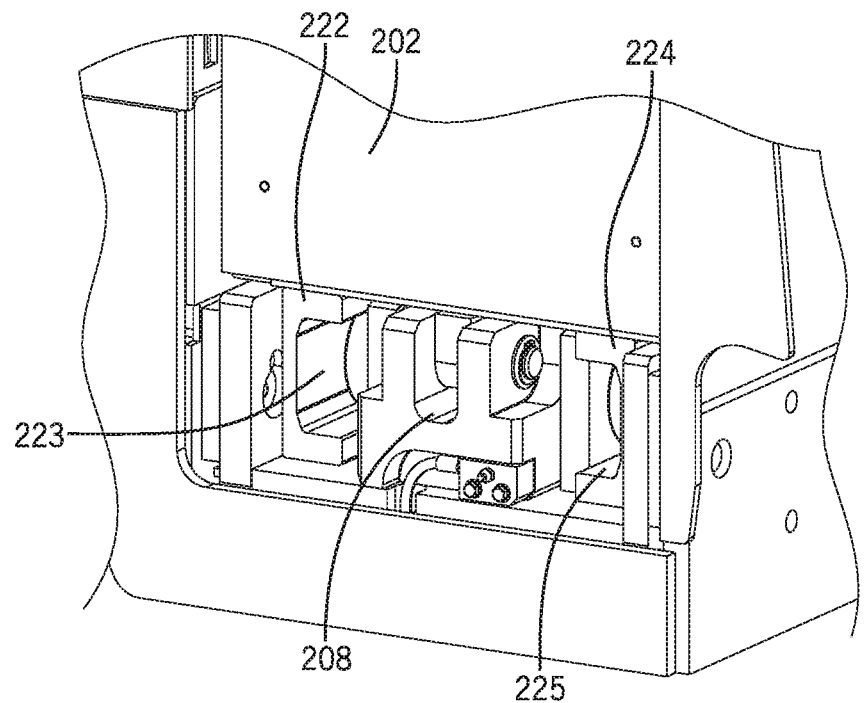
FIG. 4c is a perspective view of the battery assembly, the counterweight assembly, and the material handling vehicle of FIG. 4b, where the battery assembly is received by the counterweight assembly.
Figure 4D:
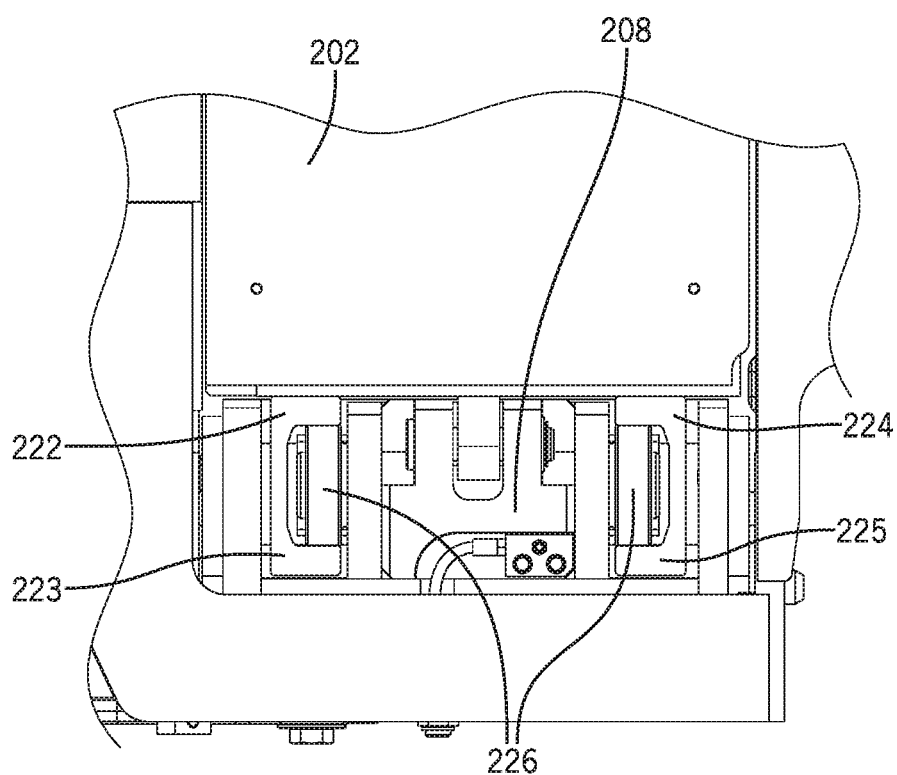
FIG. 4d is a front view of the battery assembly, the counterweight assembly, and the material handling vehicle of FIG. 4c.
Figure 5A:
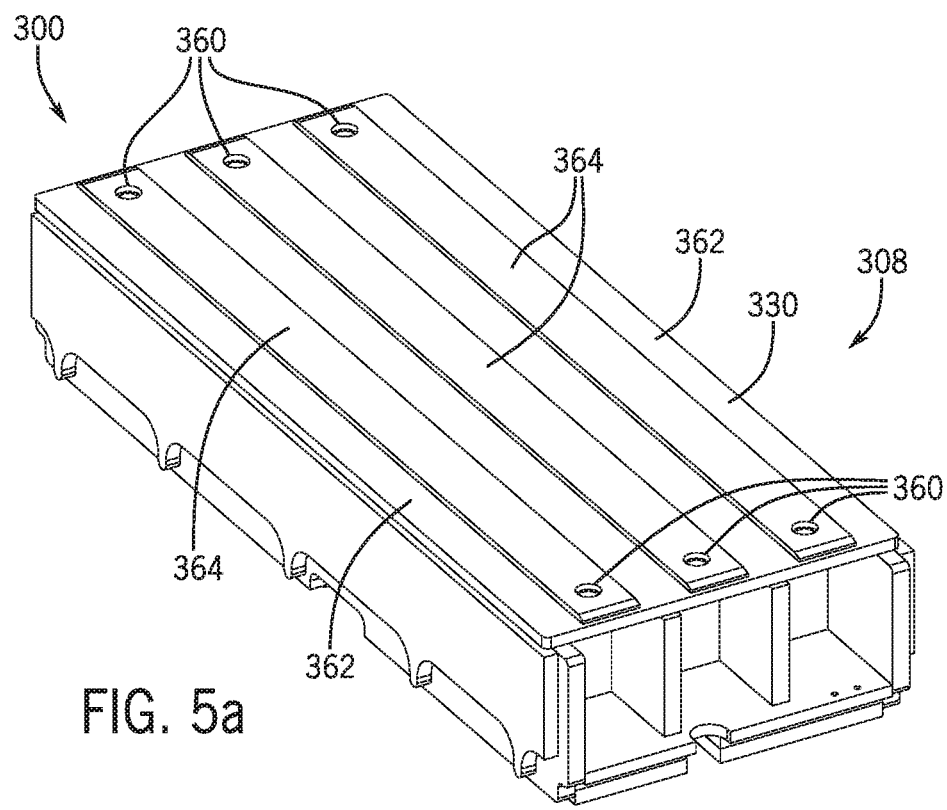
FIG. 5a is a perspective view of a counterweight assembly according to one embodiment of the invention.
Figure 5B:
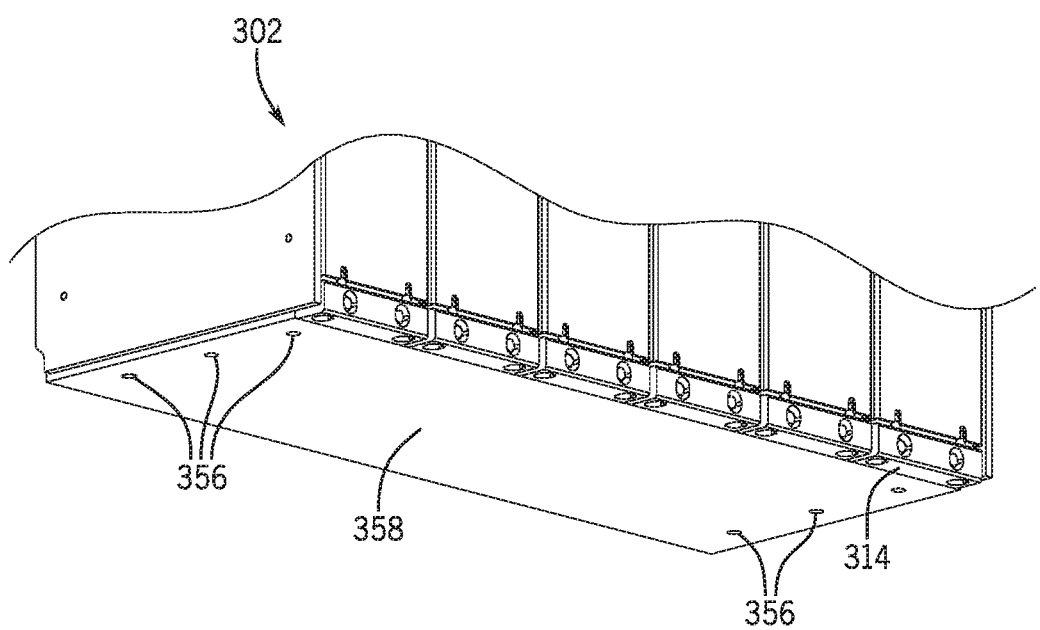
FIG. 5b is a perspective view of a battery assembly according to one embodiment of the invention.
Figure 6A:
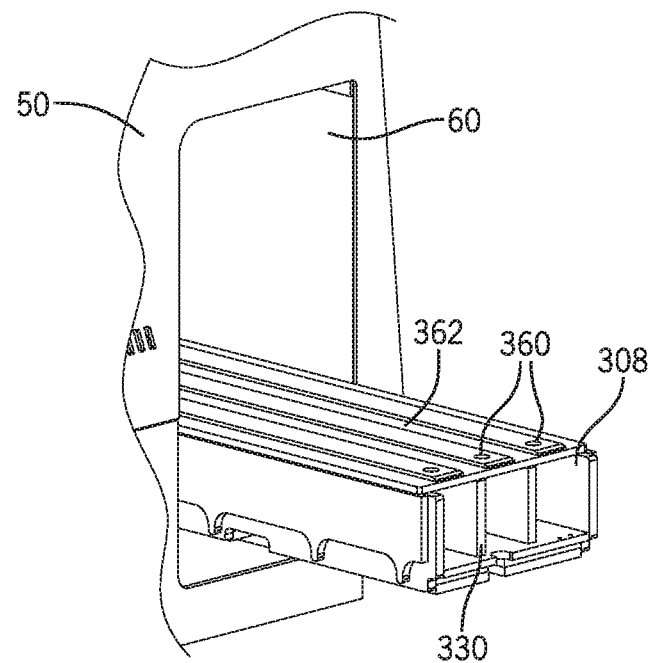
FIG. 6a is a perspective view of the counterweight assembly of FIG. 5a with a material handling vehicle.
Figure 6B:
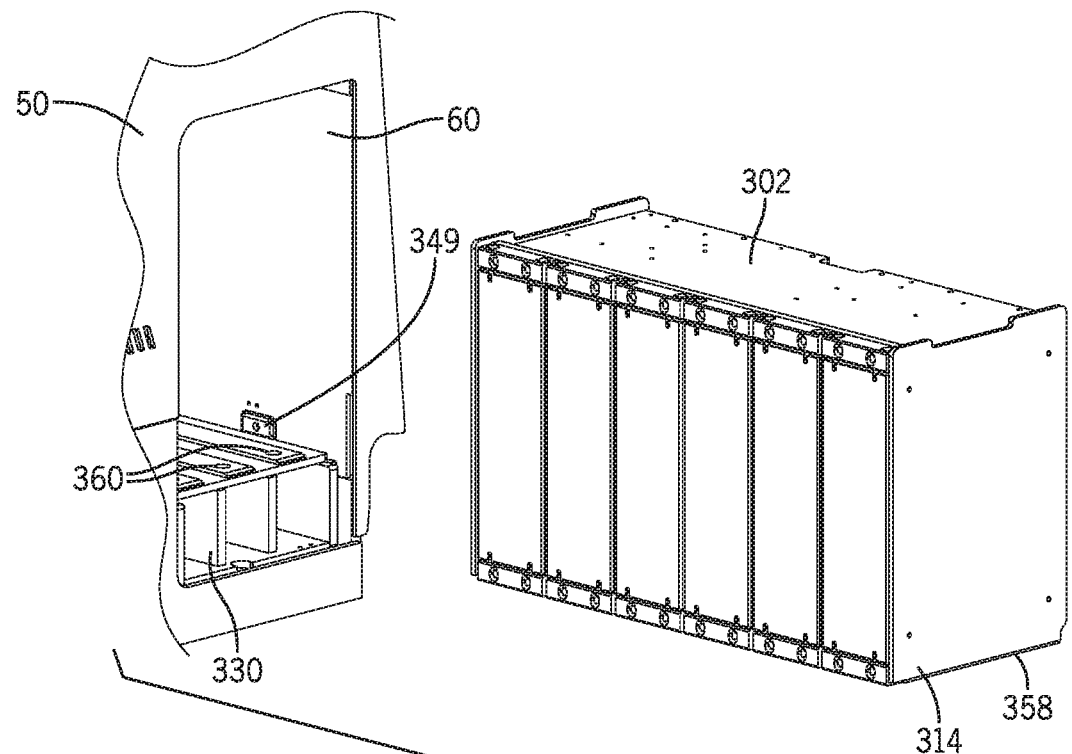
FIG. 6b is a perspective view of the battery assembly of FIG. 5b with the counterweight assembly and material handling vehicle of FIG. 6a, where the counterweight assembly is engaged with the material handling vehicle.
Figure 6C:
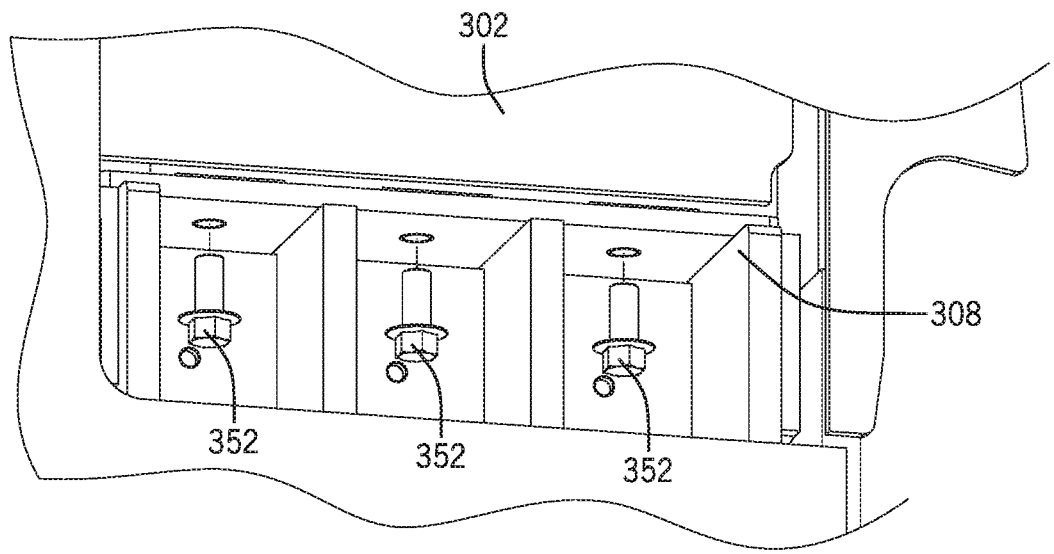
FIG. 6c is a perspective view of the battery assembly, the counterweight assembly, and the material handling vehicle of FIG. 6b, with a plurality of retention pins coupling the battery assembly to the counterweight assembly.
Figure 6D:
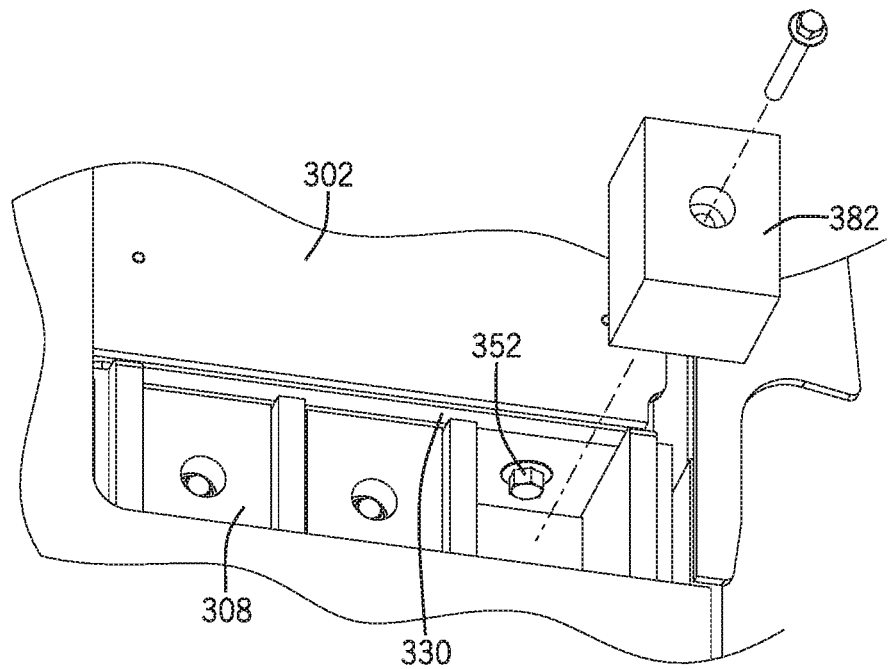
FIG. 6d is a perspective view of the battery assembly, the counterweight assembly, the material handling vehicle, and the retention pins of FIG. 6c, with a plurality of detachable weights retaining the retention pins.

As illustrated in FIGS. 2a-2d, the battery assembly 102 can be coupled to the material handling vehicle 50. In FIG. 2a, the counterweight assembly 108 can be maneuvered into the battery compartment 60 through a compartment opening 65, leading with the counterweight assembly back side 110, so that the counterweight assembly 108 is fully inserted in the battery compartment 60 and the counterweight assembly front side 109 is positioned proximate the compartment opening 65. The counterweight assembly 108 can then be maneuvered to engage the counterweight mounting interface with the vehicle mounting interface. For example, the counterweight assembly 108 can be maneuvered downward so the ridges 144 of the counterweight assembly 108 engage the slots of the material handling vehicle 50. Looking to FIG. 2b, the mounting pins 148 can be inserted into the mounting openings 140 and the corresponding enclosure openings, thereby coupling the counterweight assembly 108 to the material handling vehicle 50. After the counterweight assembly 108 has been secured to the material handling vehicle 50, the battery assembly 102 can be maneuvered to slide the battery assembly 102 into the battery compartment 60, engaging the battery attachment interface with the counterweight attachment interface. For example, the battery assembly 102 can be maneuvered so the set of roller bearings 126 closest to the battery assembly front side 103 enter the channels 132, 134 through the entry notches 150 and the battery assembly 102 is rolled into the battery compartment 60. Once the battery attachment interface is fully received by the counterweight attachment interface, as illustrated in FIGS. 2c-2d, the retention pin 152 can be inserted through the battery bracket opening 129 and the counterweight bracket opening 137, thereby securing the battery assembly 102 to the counterweight assembly 108 and indirectly to the material handling vehicle 50.

In other embodiments, other configurations are possible, including configurations that are substantially reversed from those discussed above. For example, at least one of the positioning portions 122, 124 (or alternative embodiments thereof) can be provided on the counterweight attachment interface, and the channels 132, 143 (or alternative embodiments thereof) can be provided on a corresponding battery attachment interface. Similarly, at least one ridge 142 (or an alternative embodiment of a mounting feature) can be provided on a vehicle mounting interface, and a corresponding counterweight mounting interface can include a slot (or another structural feature) configured to be engaged by the ridge on the vehicle mounting interface.

Referring now to FIGS. 3a-4d, another embodiment of a modular battery system 200 including a battery assembly 202 and a counterweight assembly 208 is illustrated. In the illustrated embodiment, a left positioning portion 222 and a right positioning portion 224 can respectively include a left channel 223 and a right channel 225, and the counterweight assembly 208 can include a plurality of roller bearings 226 rotatably coupled to a counterweight base 230. The left and right channels 223, 225 can be configured to receive the rolling bearings 226 so that the rolling bearings 226 are retained in the left and right channels 223, 225. The roller bearings 226 may provide a rolling interface between the battery assembly 202 and the counterweight assembly 208. This may be useful, for example, so that the battery assembly 202 can be rolled into position to be removably coupled to the counterweight assembly 208.

Looking to FIGS. 5a-6d, another embodiment of a modular battery system 300 including a battery assembly 302 and a counterweight assembly 308 is illustrated. In the illustrated embodiment, the battery assembly 302 can include a battery base 314 with a plurality of battery retention openings 356 formed in a lower surface 358 of the battery base 314. The counterweight assembly 308 can include a counterweight base 330 which may have a plurality of counterweight retention openings 360 formed in an upper surface 362 of the counterweight base 330. The counterweight assembly 308 can further include at least one non-metal slide 364 coupled to the upper surface 362 of the counterweight base 360. The non-metal slide 364 can provide a sliding interface with the lower surface 358 of the battery base 314. The sliding interface may be a low-friction interface that produces reduced friction forces compared to a metal-metal interface. In some embodiments, a sliding interface can be formed between the lower surface 358 of the battery base 314 and the upper surface 362 of the counterweight base 330, and no non-metal slides 364 are included. The lower surface 358 of the battery base 314 can be received by the upper surface 362 of the counterweight base 330 so that the battery assembly 302 can be slid into position to be retained once the counterweight assembly 308 is in the battery compartment 60. In some embodiments, at least one counterweight retention plate 349 can be coupled to the material handling vehicle 50 inside the battery compartment 60 and above the counterweight assembly 308. The counterweight retention plate 349 can be configured for retaining the counterweight assembly 308 within the material handling vehicle 50. A plurality of retention pins 352 can be configured to simultaneously engage the battery retention openings 356 and the counterweight retention openings 360 to couple the battery base 314 to the counterweight base 330. At least one filler blocks 382 can be coupled to the counterweight base 330 proximate the retention pins 352 so that the retention pins 352 are retained in the battery retention openings 356 and the counterweight retention openings 360.

With reference to FIGS. 7a, 7c, and 8a-8b, yet another embodiment of a modular battery system 400 including a battery assembly 402 and a counterweight assembly 408a is illustrated. Here, the battery assembly 402 can include a battery base 412 and one positioning portion 468 coupled to the battery base 414. The positioning portion 468 can extend downwardly from the battery base 414, and can be positioned centrally with respect to the battery base 414. The counterweight assembly 408 can include a counterweight base 430 with a centrally positioned channel 470 defined by a left wall 472 and a right wall 474. A plurality of roller bearings 426 can be rotatably coupled to the left and right walls 472, 474. For example, the roller bearings 426 may be positioned in recesses 476 formed in the left and right walls 472, 474. The roller bearings 426 can provide a rolling interface between the battery base 402 and the left and right walls 472, 474 of the counterweight base 430.

The battery assembly 402 can be rolled on the roller bearings 426 so that the positioning portion 468 is received in the channel 470 through a first entryway 471. Once the positioning portion 468 is fully received in the channel 470, a retention plate 478 can be coupled to the counterweight base 430 with at least one fastener 479 so that the first entryway 471 is blocked by the retention plate 478, thereby coupling the battery assembly 402 and the counterweight assembly 408a. An additional retention bolt 480 can be used to further secure the battery assembly 402 to the counterweight assembly 408a. In some embodiments, the channel 470 can run the entire length of the counterweight base 430 and an additional retention plate 478 may be utilized to block a second entryway 477 on the opposite side of the channel 470 as the first entryway 471.

Figure 7A:
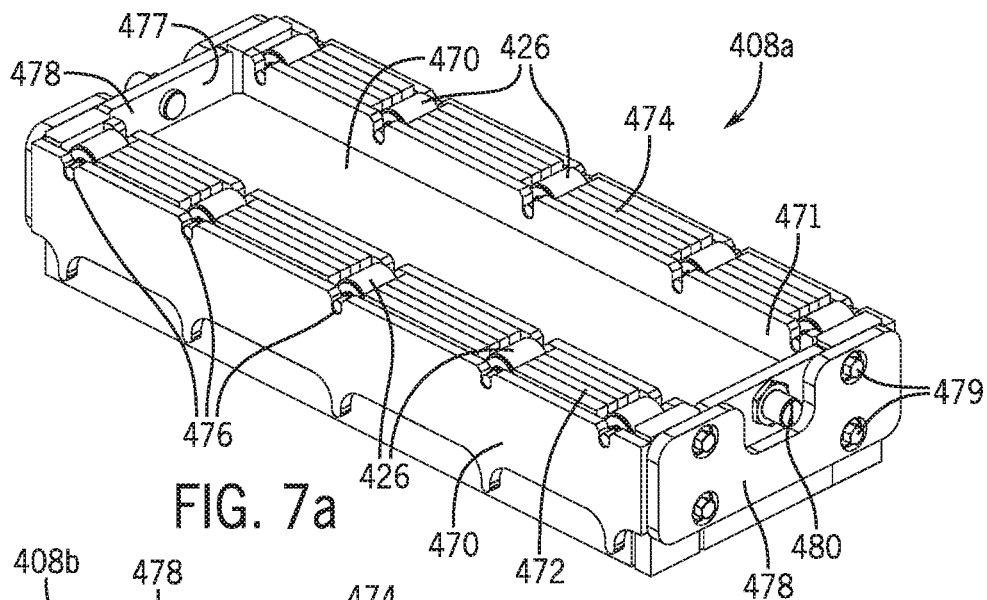
FIG. 7a is a perspective view of a counterweight assembly according to one embodiment of the invention.
Figure 7B:
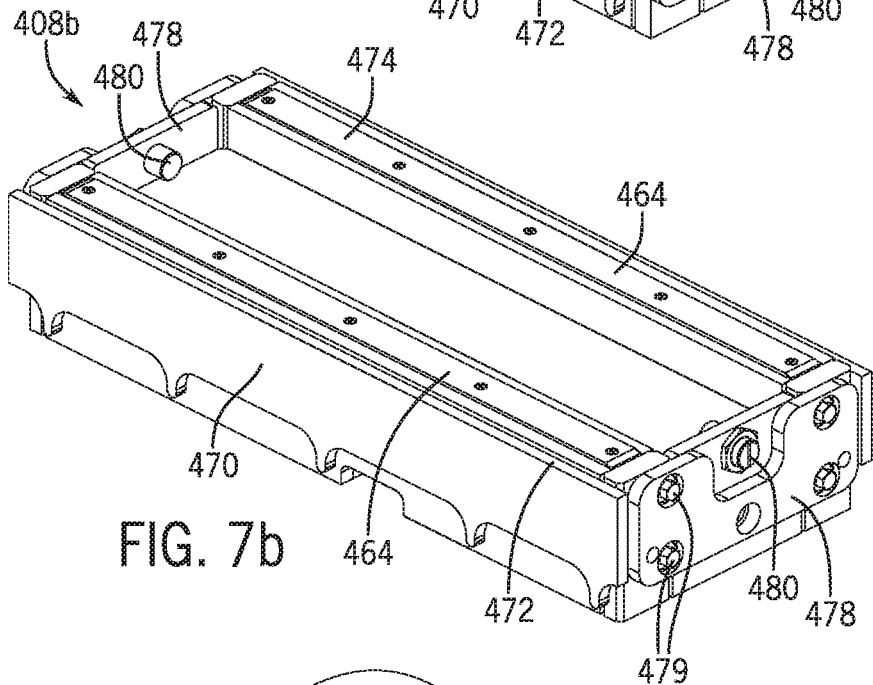
FIG. 7b is a perspective view of a counterweight assembly according to one embodiment of the invention.
Figure 7C:
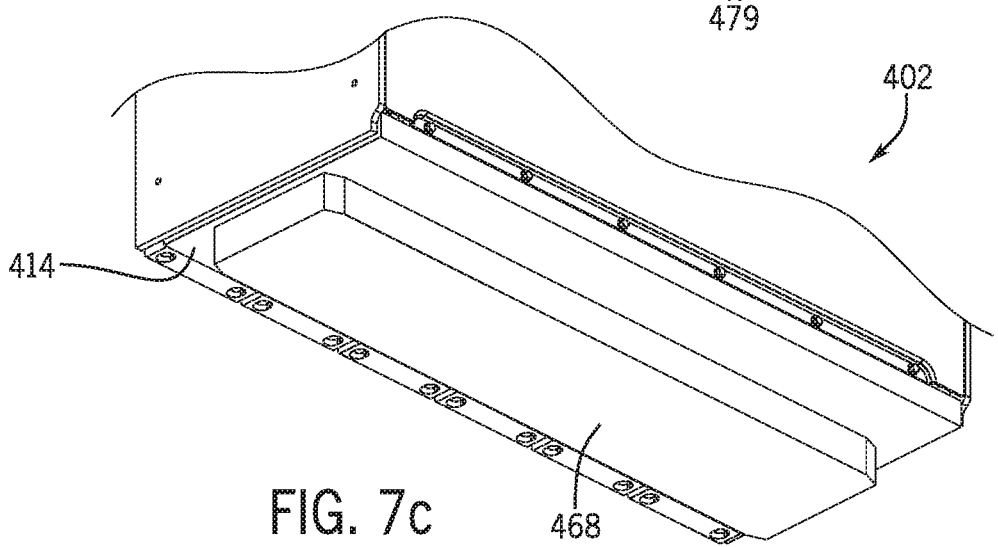
FIG. 7c is a perspective view of a battery assembly according to one embodiment of the invention.
Figure 8A:
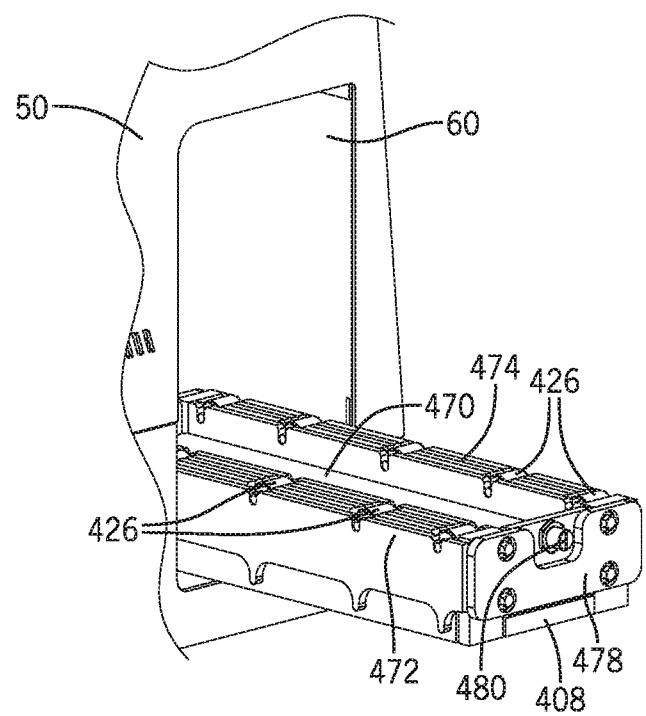
FIG. 8a is a perspective view of the counterweight assembly of FIG. 7a with a material handling vehicle.
Figure 8B:
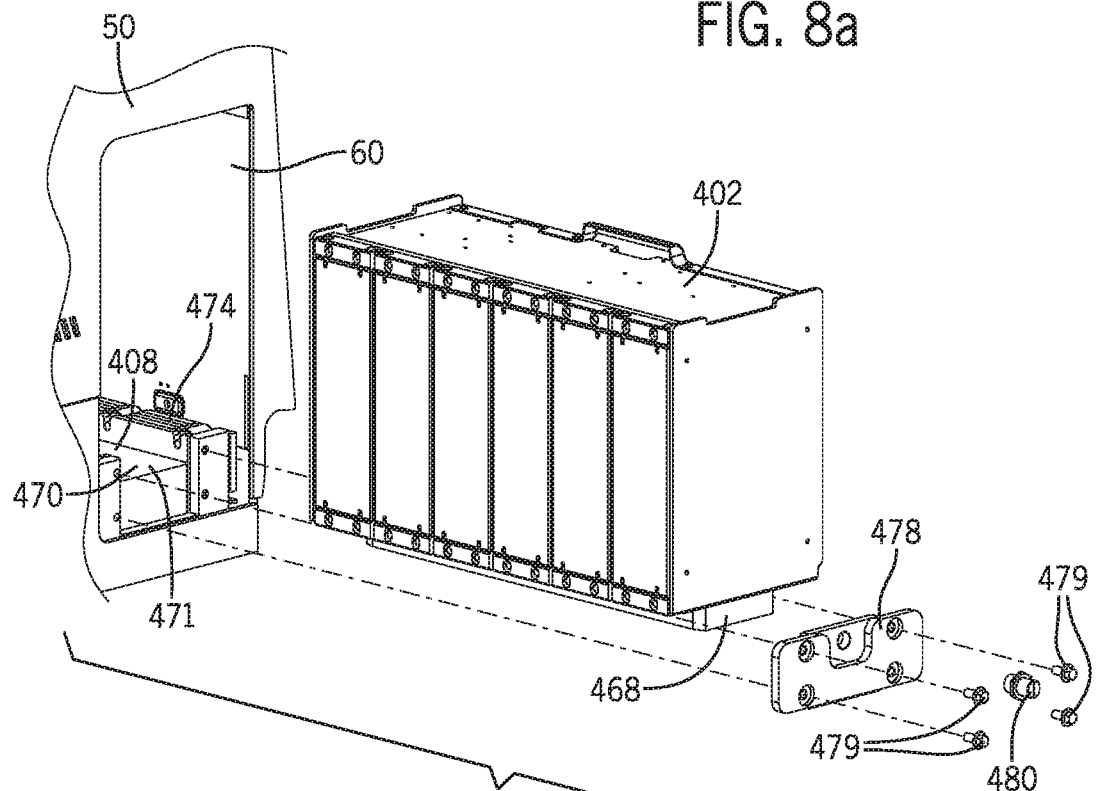
FIG. 8b is a perspective view of the battery assembly of FIG. 7c with the counterweight assembly and material handling vehicle of FIG. 8a, where the counterweight assembly is engaged with the material handling vehicle.
Figure 9A:
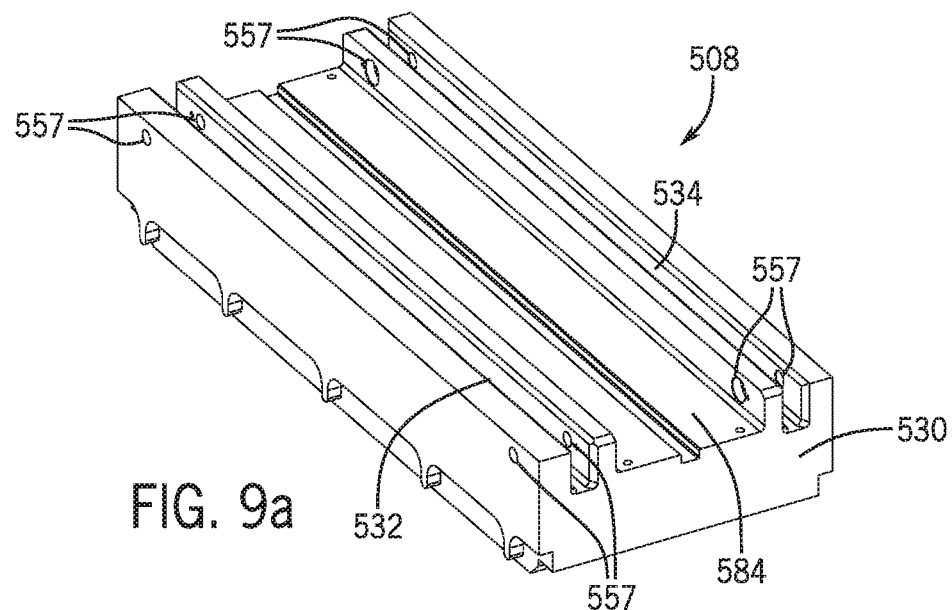
FIG. 9a is a perspective view of a counterweight assembly according to one embodiment of the invention.
Figure 9B:
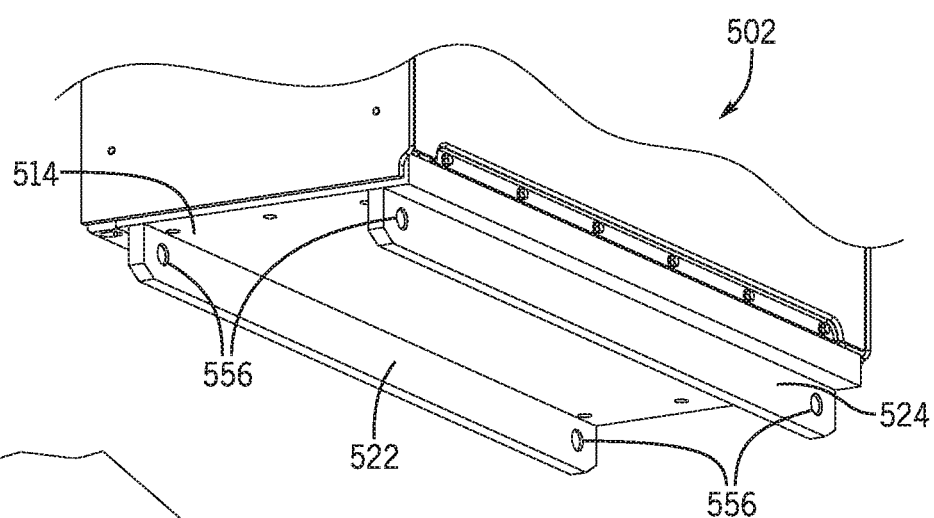
FIG. 9b is a perspective view of a battery assembly according to one embodiment of the invention.
Figure 9C:
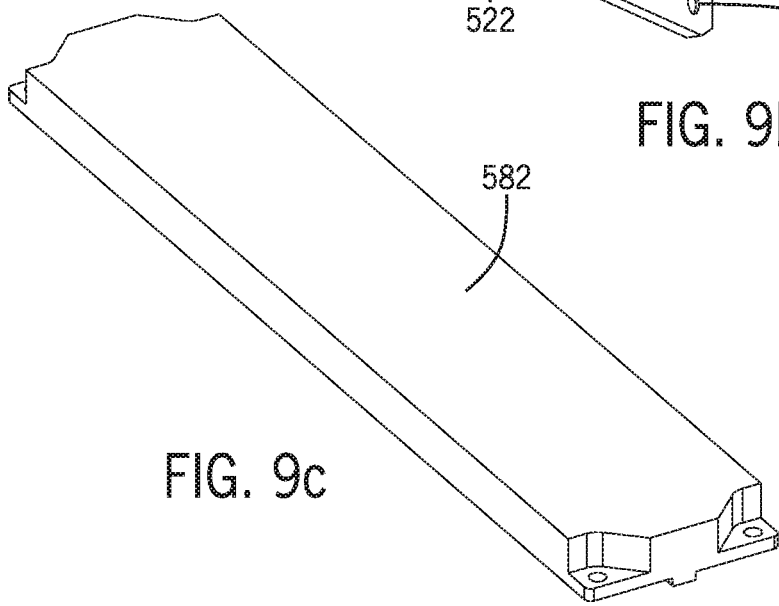
FIG. 9c is a perspective view of a detachable weight assembly according to one embodiment of the invention.
Figure 11A:
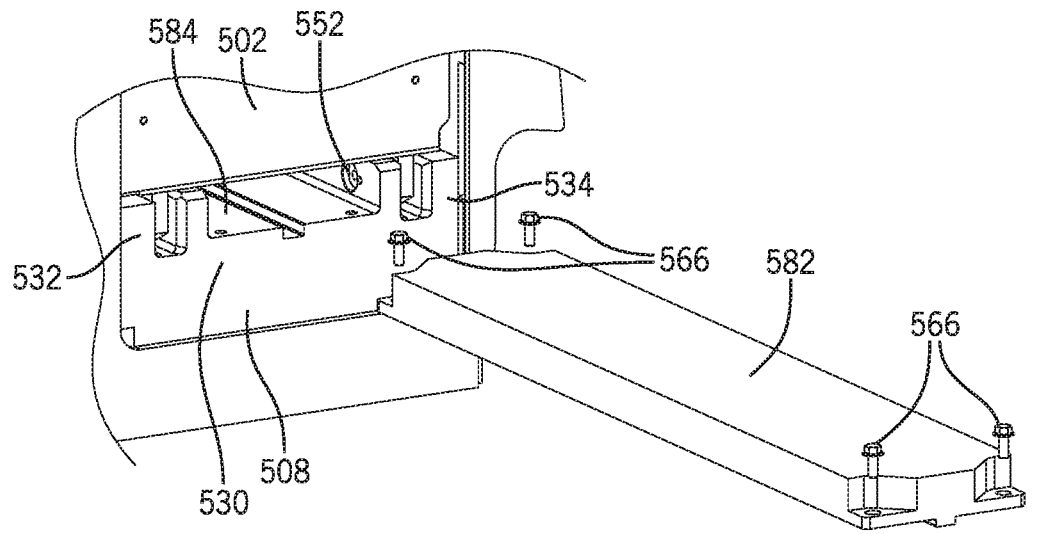
FIG. 11a is a perspective view of the detachable weight of FIG. 9c with the battery assembly, the counterweight assembly, and the material handling vehicle of FIG. 10b, where the battery assembly is received by the counterweight assembly.
Figure 11B:
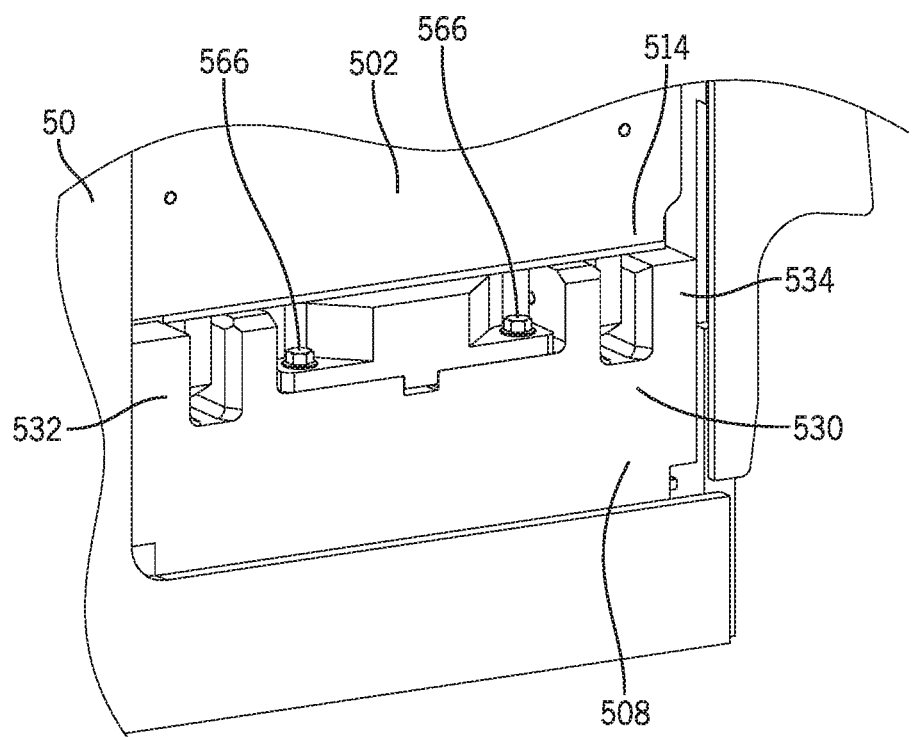
FIG. 11b is a perspective view of the detachable weight, the battery assembly, the counterweight assembly, and the material handling vehicle of FIG. 11a, where the detachable weight is coupled to the counterweight assembly.

In some embodiments, a counterweight base 408b (FIG. 7) having at least one nonmetal slide 464 coupled to each of the left and right walls 472, 474 can be used in as an alternative to counterweight base 408 in the modular battery system 400.

Referring now to FIGS. 9a-11b, an embodiment of a modular battery system 500 including a battery assembly 502, a counterweight assembly 508, and a detachable weight 582 is illustrated. The battery assembly 502 can include a left positioning portion 522 and a right positioning portion 524 with at least one battery retention opening 556 formed in at least one of the left positioning portion 522 and the right positioning portion 524. The counterweight assembly 508 can include a left channel 532 and a right channel 534 coupled to a counterweight base 530, and a central void 584 formed between the left channel and right channels 532, 534. At least one pair of counterweight retention openings 557 corresponding to a battery retention opening 556 can be formed in at least one of the left channel 532 and the right channel 534 so that one counterweight retention opening 557 is formed on either side of the left or right channel 532, 534 and so that the pair of counterweight retention openings 557 are concentric.

The left and right channels 532, 534 can be configured to receive the left and right positioning portions, respectively, allowing the battery assembly 502 to be slid into position to be coupled with the counterweight assembly 508. A retention pin 552 can be inserted into one of the counterweight retention opening 557 from the side of the central void 584 so that the retention pin 552 engages both of the pair of counterweight retention openings 557 and the corresponding battery retention opening 556. The detachable weight 582 can be inserted into the central void 584 and may be coupled to the counterweight base 530 with at least one bolt 566. Once inserted, the detachable weight 582 retains the retention pins 552 in the battery retention openings 556 and the counterweight retention opening 557, thereby coupling the battery base 514 to the counterweight base 530.

Figure 12:
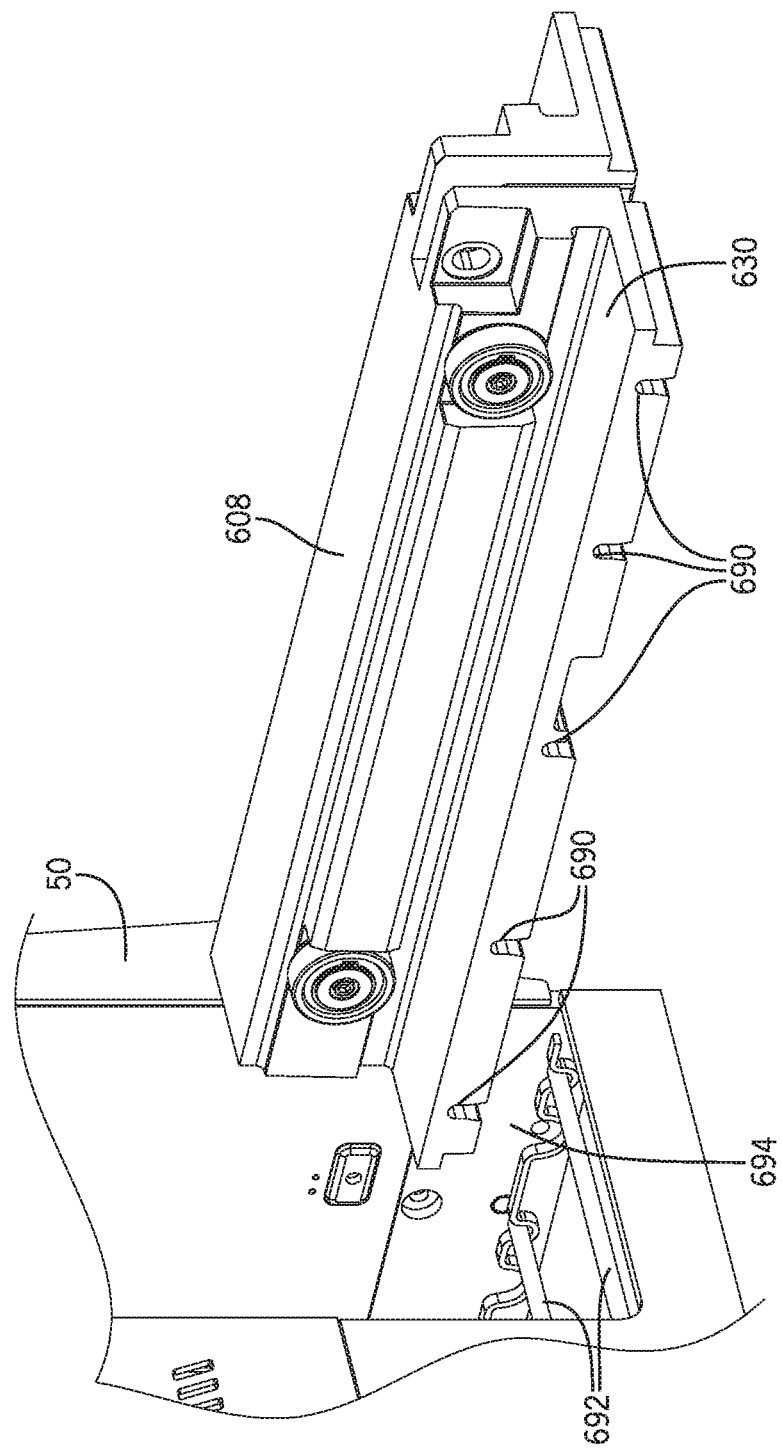
FIG. 12 is a perspective view of a counterweight assembly with a material handling vehicle according to one embodiment of the invention.

In some embodiments, for example as illustrated in FIG. 12, the counterweight mounting interface of a counterweight assembly 608 can include at least one positioning notch 690 formed in the bottom of the counterweight base 630. The positioning notches 690 can run longitudinally across the counterweight base and can be parallel to each other. Each one of the positioning notches 690 can be configures to receive a positioning bar 692, which may be part of the vehicle mounting interface and can be coupled to the material handling vehicle 50. The positioning bars 692 can be configured to restrict the motion of the counterweight assembly 108 with respect to the material handling vehicle 50 when the positioning bars 692 are engaged with the positioning notches 690. In some embodiments, the positioning bars 692 may be connected to a positioning bar frame 694 which can be coupled to the material handling vehicle. Additionally or alternatively, at least one positioning bar can be a separate part that is individually coupled to the material handling vehicle 50, and at least one positioning bar can be integrally formed in the material handling vehicle 50.

Some embodiments of a modular battery system can include additional components configured to perform functions related to the operation of a material handling vehicle. For example, as illustrated in FIG. 1a, a counterweight assembly 108 can include a grease fitting assembly configured to supply grease to a steering linkage of the material handling vehicle 50. A grease manifold can be positioned on the counterweight assembly front side 109, and a supply hose can extend from the grease manifold, through the counterweight base 130, to an outlet on the bottom of the counterweight assembly 108. The position of the outlet may corresponds to the position of the steering manifold when the counterweight assembly 108 is positioned within the battery compartment 60. As illustrated in FIGS. 2c and 2d, the grease manifold may be accessible while the counterweight assembly 108 and the battery assembly 102 are received in the battery compartment 60. This may be useful, for example, in order to provide grease to a steering manifold without removing the battery assembly 102 or the counterweight assembly 108. In some embodiments, a grease fitting assembly can have a different configuration. For example, a grease fitting assembly can be positioned on the battery assembly or the material handling vehicle, and a grease fitting assembly can be configured to supply grease to a steering manifold that is in a different location on a material handling vehicle.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

What is claimed is:

1. A modular battery system for a material handling vehicle, the modular battery system comprising:
   a battery assembly including a battery base configured to support a power source, the battery base including a battery attachment interface;
   a counterweight assembly including a counterweight base with a counterweight attachment interface configured to slidably engage the battery attachment interface to selectively secure the battery assembly to the counterweight assembly; and
   a retention pin configured to be manually engaged with a first opening attachment in the battery attachment interface and a second attachment opening in the counterweight attachment interface to restrict movement of the battery assembly relative to the counterweight assembly.

2. The system of claim 1, wherein one of the battery attachment interface and the counterweight attachment interface is configured as a first attachment interface that includes a positioning portion;
   the other of the battery attachment interface and the counterweight attachment interface is configured as a second attachment interface that includes a channel configured to slidably receive the positioning portion; and
   wherein movement of the battery assembly with respect to the counterweight assembly is restricted in at least one direction when the positioning portion is received in the channel.

3. The system of claim 2, wherein the positioning portion includes a roller bearing configured to provide a rolling interface between the positioning portion and the channel.

4. The system of claim 2, wherein the positioning portion is configured as a left positioning portion and the first attachment interface includes an additional positioning portion configured as a right positioning portion;
   the channel is configured as a left channel for engaging the left positioning portion and the second attachment interface includes an additional channel configured as a right channel for engaging the right positioning portion.

5. The system of claim 1, wherein at least one of the battery attachment interface and the counterweight attachment interface includes a roller bearing configured to provide a rolling interface between the battery attachment interface and the counterweight attachment interface.

6. The system of claim 5, wherein the roller bearing includes a shimming puck for adjusting a position of the roller bearing.

7. The system of claim 1, wherein at least one of the battery attachment interface and the counterweight attachment interface includes a non-metal slide configured to provide a sliding interface between the battery attachment interface and the counterweight attachment interface.

8. The system of claim 1, wherein the counterweight assembly further includes a detachable weight configured to be manually coupled to the counterweight base.

9. The system of claim 1, wherein the first opening is formed in a battery bracket and the second opening is formed in a counterweight bracket.

10. The system of claim 1, further comprising a detachable weight configured to be secured to the counterweight assembly; and
wherein the detachable weight inhibits disengagement of the retention pin from the first attachment opening and the second attachment opening.

11. The system of claim 1, further comprising a retention plate configured to be manually secured to at least one of the battery assembly and the counterweight assembly to restrict movement of the battery assembly relative to the counterweight assembly.

12. A material handling vehicle comprising:
a vehicle body including a battery compartment;
a counterweight assembly configured to be received in the battery compartment;
a battery assembly including an energy source for powering the material handling vehicle, the battery assembly being configured to be slidably received by the counterweight assembly; and
a retention pin configured to be manually engaged with a first opening of the battery assembly and a second opening of the counterweight assembly to restrict movement of the battery assembly relative to the counterweight assembly.

13. The material handling vehicle of claim 12, wherein the vehicle body includes a vehicle mounting interface positioned within the battery compartment and the counterweight assembly includes a counterweight mounting interface configured to be manually engaged with the vehicle mounting interface,
wherein one of the vehicle mounting interface and the counterweight mounting interface is configured as a first mounting interface that includes a mounting feature;
the other of the vehicle mounting interface and the counterweight mounting interface is configured as a second mounting interface configured to be engaged by the mounting feature; and
wherein movement of the counterweight assembly with respect to the vehicle body is restricted in at least one direction when the mounting feature is engaged with the second mounting interface.

14. The material handling vehicle of claim 13, wherein the mounting feature is configured as a ridge and the second mounting interface includes a slot configured to receive the ridge.

15. The material handling vehicle of claim 13, wherein the first mounting interface includes a positioning bar extending across the counterweight assembly or the battery compartment; and
wherein the second mounting interface includes a slot configured to receive the positioning bar.

16. The material handling vehicle of claim 12, further comprising a mounting pin configured to be manually engaged with a first mounting opening in vehicle mounting interface and a second mounting opening in a counterweight mounting interface of the vehicle body to restrict movement of the counterweight assembly relative to the vehicle body.

17. A method of coupling a battery assembly and a counterweight assembly to a material handling vehicle including a battery compartment, the method comprising:
receiving the counterweight assembly into the battery compartment;
engaging a vehicle mounting interface in the battery compartment with a counterweight mounting interface on the counterweight assembly;
slidably receiving the battery assembly into the battery compartment to engage a counterweight attachment interface with a battery attachment interface; and
coupling the battery assembly to the counterweight assembly by inserting a retention pin through a first opening in the battery attachment interface and a second opening in the counterweight attachment interface, thereby coupling the battery assembly to the material handling vehicle.

18. The method of claim 17, wherein at least one of the battery attachment interface and the counterweight attachment interface includes a roller bearing; and
wherein the step of slidably receiving the battery assembly includes rolling the battery assembly into the battery compartment on a rolling interface provided by the roller bearing.

19. The method of claim 17, wherein the step of slidably receiving the battery assembly includes inserting a positioning portion into a channel.

* * * * *